(12) United States Patent
Yamakawa et al.

(10) Patent No.: US 9,891,426 B2
(45) Date of Patent: Feb. 13, 2018

(54) LASER SCANNING DISPLAY DEVICE

(71) Applicant: NIPPON SEIKI CO., LTD., Niigata (JP)

(72) Inventors: Yasuhiro Yamakawa, Niigata (JP); Shun Sekiya, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/433,575

(22) PCT Filed: Sep. 6, 2013

(86) PCT No.: PCT/JP2013/074058
§ 371 (c)(1),
(2) Date: Apr. 3, 2015

(87) PCT Pub. No.: WO2014/054378
PCT Pub. Date: Apr. 10, 2014

(65) Prior Publication Data
US 2015/0260984 A1 Sep. 17, 2015

(30) Foreign Application Priority Data
Oct. 5, 2012 (JP) .................................. 2012-222622

(51) Int. Cl.
*G02B 26/02* (2006.01)
*H04N 9/31* (2006.01)
*B60K 35/00* (2006.01)
*G02B 26/10* (2006.01)
*G02B 27/01* (2006.01)

(52) U.S. Cl.
CPC .............. *G02B 26/02* (2013.01); *B60K 35/00* (2013.01); *G02B 26/10* (2013.01); *G02B 27/01* (2013.01);
(Continued)

(58) Field of Classification Search
CPC ................................ G02B 26/02; B60K 35/00
(Continued)

(56) References Cited

U.S. PATENT DOCUMENTS

2009/0237622 A1* 9/2009 Nishioka ............. H04N 9/3155
353/85
2011/0042588 A1* 2/2011 Barbastathis ....... G03F 7/70291
250/492.22
(Continued)

FOREIGN PATENT DOCUMENTS

JP 05-193400 A 8/1993
JP 07-270711 A 10/1995
(Continued)

OTHER PUBLICATIONS

International Search Report issued in International Application No. PCT/JP2013/074058 dated Oct. 15, 2013, with English translation.

*Primary Examiner* — Yuehan Wang
(74) *Attorney, Agent, or Firm* — McDermott Will & Emery LLP

(57) ABSTRACT

A dimmer unit is equipped with a first light detection unit that modulates the light intensity of composite laser light emitted from a composite laser light emission unit and detects the light intensity of the composite laser light before entering the dimmer unit, and a second light detection unit that detects the light intensity of the composite laser light after entering the dimmer unit. The light intensity characteristic for each color in the composite laser light emission unit is calculated on the basis of the light intensity detected by the first light detection unit, and the white balance of each color in the composite laser light emission unit is adjusted on the basis of the light intensity detected by the second light detection unit.

8 Claims, 10 Drawing Sheets

(52) U.S. Cl.
CPC ....... *G02B 27/0101* (2013.01); *H04N 9/3129* (2013.01); *H04N 9/3135* (2013.01); *H04N 9/3155* (2013.01); *H04N 9/3182* (2013.01); *G02B 2027/014* (2013.01); *G02B 2027/0112* (2013.01); *G02B 2027/0118* (2013.01)

(58) Field of Classification Search
USPC ........................................................ 345/519
See application file for complete search history.

(56) References Cited

U.S. PATENT DOCUMENTS

| | | | | |
|---|---|---|---|---|
| 2012/0188623 | A1* | 7/2012 | Inoue | G02B 26/101 |
| | | | | 359/197.1 |
| 2012/0218282 | A1* | 8/2012 | Choboter | G09G 5/00 |
| | | | | 345/589 |
| 2013/0241971 | A1* | 9/2013 | Sekiya | G02B 26/101 |
| | | | | 345/690 |
| 2014/0152711 | A1* | 6/2014 | Sekiya | G02B 27/0101 |
| | | | | 345/690 |

FOREIGN PATENT DOCUMENTS

| | | |
|---|---|---|
| JP | 2008-145455 A | 6/2008 |
| JP | 2009-229558 | 10/2009 |
| JP | 2010-107615 A | 5/2010 |
| JP | 2012-108397 A | 6/2012 |
| JP | 2012-155019 | 8/2012 |
| WO | 2013/005525 | 10/2013 |

* cited by examiner 14a, 14b, 14c } Condensing unit 14
15a, 15b, 15c } Combining unit 15

FIG.14

Light intensity characteristic P
(change due to harsh environments or the like)

| Gradation area (unchanged) | Gradation level E (unchanged) | Light intensity L (unchanged) | Current control data I (obatained, calculated) | toning correction value H (calculated) | PWM value D (unchanged) |
|---|---|---|---|---|---|
| Low gradation area | 0 | 0 | I m (obatained) | H | 0 |
| | 1 | L m*D 1 | I m (obatained) | H | D1 |
| | 2 | L m*D 2 | I m (obatained) | H | D2 |
| | ⋮ | L m*D n | I m (obatained) | H | Dn |
| Main gradation area | E m | L m | I m (obatained) | H | 1 0 0 % |
| | E m+1 | Set value | Current control data I (calculated) | H | 1 0 0 % |
| | ⋮ | Set value | Current control data I (calculated) | H | 1 0 0 % |
| | E n−1 | Set value | Current control data I (calculated) | H | 1 0 0 % |
| | E n | L n | I n (obatained) | H | 1 0 0 % |

Gradation characteristic Q (unchanged data)

LASER SCANNING DISPLAY DEVICE

RELATED APPLICATIONS

This application is the U.S. National Phase under 35 U.S.C. § 371 of International Application No. PCT/JP2013/074058, filed on Sep. 6, 2013, which in turn claims the benefit of Japanese Application No. 2012-222622, filed on Oct. 5, 2012, the disclosures of which Applications are incorporated by reference herein.

TECHNICAL FIELD

The present invention relates to a laser scanning display device, which displays an image by optically scanning a laser light emitted from a laser light source.

BACKGROUND ART

Patent Literature 1 discloses a laser scanning display device, which generates a display image by scanning a laser light emitted from a laser light source on a screen through a scanning system.

The current-light intensity characteristics of a laser light source (light intensity characteristics: the relationship between the supplied current and the emitted light intensity) change due to a driving heat, an outside temperature change and the like. Thus, even if a predetermined current is supplied to a laser source to obtain a desired light intensity, the desired light intensity is not obtained, and an image is not displayed with desired display brightness.

Patent Literature 2 discloses a laser scanning display device, which supplies a current to a light source by changing a value at two or more points, calculates the light intensity characteristic of the light source based on the light intensity detected by a light detection unit at this time, and adjusts the current supplied to the laser light source based on the calculation result, in order to stabilize the brightness of an image to be displayed.

CITATION LIST

Patent Literature

PTL 1: JP-A-5-193400
PTL 2: JP-A-7-270711

SUMMARY OF THE INVENTION

Technical Problem

In such a laser scanning display device, when displaying a color image, a laser light source having a plurality of colors is used, and the light intensity characteristic is calculated and updated for the laser light source of each color. However, when the light intensity characteristic is updated for each laser light of each color, adjustment of white balance is delayed with respect to the update of the light intensity characteristic of the laser light, the white balance of each color is lost, and an image of a desired display color is not quickly obtained.

The applicant has proposed a laser scanning display device in the patent application No. 2011-149632. The laser scanning display device uses a polarization control element such as a liquid crystal panel for controlling a laser light in order to adjust the brightness of an image to be displayed. However, the polarization control element has a wavelength dependency for each color, and when dimming is carried out by the polarization control element, adjustment of the white balance of the laser source of each color is more difficult, and an image of a desired display color is not obtained.

The present invention has been made in order to solve the problems described above. It is an object of the invention to provide a laser scanning display device, which can quickly provide an image of stable display color and brightness even when the light intensity characteristic of a laser light source change due to harsh environments or the like.

Solution to Problem

The present invention has adopted the following means in order to solve the above problems.

Accordingly, an embodiment of the invention comprises a dimmer means for modulating the light intensity of a laser light emitted from a light source, a first light detection means for detecting the light intensity of a laser light before entering the dimmer means, and a second light detection means for detecting the light intensity of a laser light after entering the dimmer means, wherein the light intensity characteristic of each color of the light source is calculated based on the light intensity detected by the first light intensity detection means, and the white balance of each color of the light source is adjusted based on the light intensity detected by the second light intensity detection means.

The present invention to solve the problems described above, a laser scanning display device characterized by comprising: a plurality of light sources of different emission colors that emits a laser light with a light intensity corresponding to a current supplied; a storage means that stores a gradation level of a plurality of steps corresponding to a plurality of reference light intensities as a reference, and current control data associating with the gradation level and indicating a current supplied to the light source; a light source control means that adjusts a current supplied to the light source by switching the gradation level based on an image signal; a dimmer means that modulates the light intensity of the laser light emitted from the light source; a first light detection means that detects the light intensity of the laser light before entering the dimmer means; a second light detection means that detects the light intensity of the laser light after entering the dimmer means; a scanning means that displays a predetermined image in a display unit by scanning the laser light after entering the dimmer means; a gradation correction means that calculates a current-light intensity characteristic of each color of the light source, based on the light intensity of the light source detected by the first light detection means by supplying a predetermined current from the light source control means, and corrects the current control data stored in the storage unit, based on the calculated current-light intensity characteristic; and a toning correction means that detects the light intensity of the light source detected by the second light detection means by supplying a predetermined current from the light source control unit, compares the detected light intensities of each color of the light source, and adjusts a white balance by correcting the current control data.

The laser scanning display device according to a second aspect of the present invention, one of at least the first light detection means and second light detection means is a branched light detection means having: a light branching means that branches the laser light; and a light intensity detection unit that detects the light intensity of one of the laser lights branched by the light branching means.

The laser scanning display device according to a third aspect of the present invention, further comprising a scanning position detection means that detects a scanning position of the scanning means, characterized in that: an area scanned by the scanning means has a display area to output the laser light scanned by the scanning means to the outside, and a non-display area not to output the laser light to the outside, and the gradation correction means and the toning correction means use the first light detection means and the second light detection means, when the scanning position of the scanning means is in the non-display area.

The laser scanning display device according to a fourth aspect of the present invention, when the scanning position detection means detects a specific toning start position between a position to complete scanning of the display area and a position to start scanning of the display area in the next frame, the toning correction means starts correction of the current control data stored in the storage unit.

The laser scanning display device according to a fifth aspect of the present invention, the gradation correction means rewrites the current control data in the storage unit, until the scanning position detection means detects the toning start position after completing the scan of the display area.

Advantageous Effects of Invention

According to an embodiment of the invention, there is provided a laser scanning display device, which can quickly provide an image of stable display color and display brightness even when the light intensity characteristic of a laser light source is changed due to harsh environments or the like.

BRIEF DESCRIPTION OF THE DRAWINGS

FIG. 14 is a diagram explaining various data stored in a storage unit in the HUD device of the embodiment.

DESCRIPTION OF EMBODIMENTS

Hereinafter, based on the accompanying drawings, a description will be given of an embodiment wherein a laser scanning display device of the invention applies to a head-up display device (HUD device) to be mounted on a vehicle.

Figure 1:
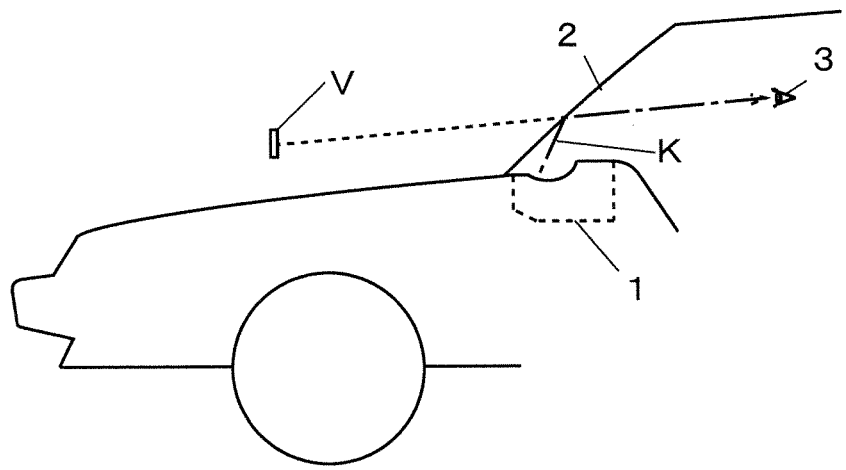
FIG. 1 is a diagram for explaining a mounted state of a HUD device according to an embodiment of the invention.

A HUD device 1 according to a first embodiment of the invention is disposed on a dashboard of a vehicle 2 as shown in FIG. 1, and configured to emit a display light K representing an image M (see FIG. 2) notifying predetermined information toward a windshield 3. The display light K is reflected by the windshield 3, and recognized by an observer (a driver of the vehicle 2 in most cases) as a virtual image V formed in front of the windshield 3. In this manner, the HUD device 1 causes the observer 3 to visually recognize the image.

Figure 2:
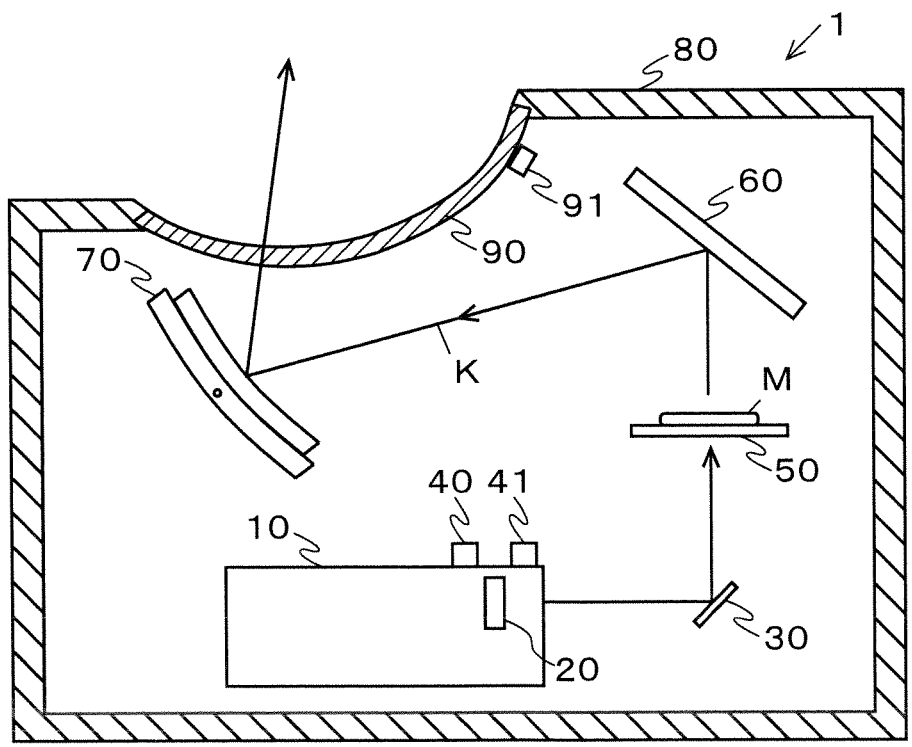
FIG. 2 is a schematic cross-sectional view of the HUD device according to the embodiment.

As shown in FIG. 2, the HUD device 1 comprises a composite laser light emission unit 10, a dimmer unit (dimmer means) 20, a micro electro mechanical system (MEMS) mirror (scanning means) 30, a first light detection unit 40, a second light detection unit 41, a screen (display unit) 50, a first reflection unit 60, a second reflection unit 70, a housing 80, a translucent part 90, and an external light sensor 91.

Figure 3:
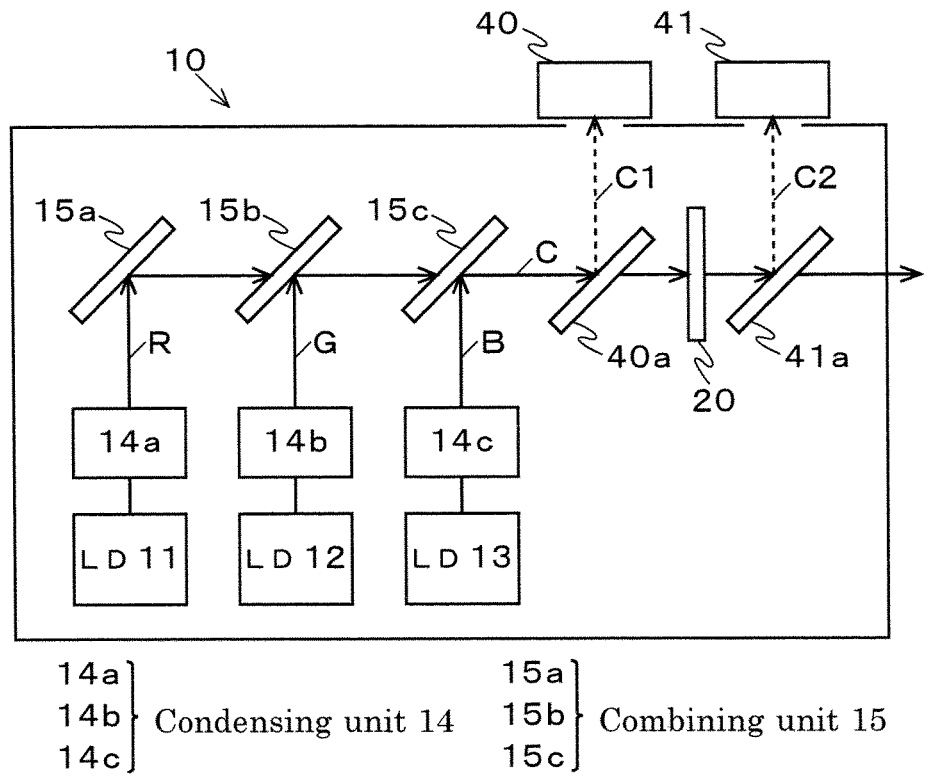
FIG. 3 is a schematic cross-sectional view of a composite laser light emission unit in the embodiment.

The composite laser light emission unit 10 emits a composite laser light C described later toward the MEMS mirror 30, and as shown in FIG. 3, includes laser diodes (hereinafter, referred to as an LB) 11, 12 and 13, a condensing unit 14, and a combining unit 15.

The LD 11 emits a red laser light R. The LD 12 emits a green laser light G. The LD 13 emits a blue laser light B. The LD 11, LD 12, and LD 13 receive a drive signal (drive current) from an LD control unit 100 described later, and emits light at a predetermined light intensity and timing.

The LD 11, LD 12, and LD 13 change in the light intensity characteristic due to the heat generated upon emission of laser light, changes in the outside temperature and the like. In particular, the relationship between the supplied current and the light intensity (current-light intensity characteristic) changes due to temperature changes. However, as described later, even when the light intensity characteristic changes due to temperature changes, the HUD device 1 exactly reflects the changed light intensity characteristic, and can drive the LD 11, LD 12, and LD 13 (can adjust the supplied current).

The condensing unit 14 condenses the laser light R, G, and B emitted respectively from the LD 11, LD 12, and LD 13, reduces a spot diameter, and makes a convergent light. Specifically, the condensing unit 14 is configured with condensing parts 14a, 14b, and 14c, each comprising a lens or the likes. The condensing part 14a is located on the optical path of the laser light R emitted from the LD 11. The condensing part 14b is located on the optical path of the laser light G emitted from the LD 12. The condensing part 14c is located on the optical path of the laser light B emitted from the LD 13.

The combining unit 15 combines the laser light R, G and B emitted from the LD 11, LD 12, and LD 13, and reached through the condensing unit 14, and emits as a composite laser light C. Specifically, the combining unit 15 is configured with a reflection part 15a, a combining part 15b, and a combining part 15c, each comprising a dichroic mirror or the like reflecting light of a specific wavelength and transmitting lights of the other wavelengths.

The reflection part 15a reflects the incident laser light R to the combining part 15b.

The combining part 15b transmits the laser light R from the combining part 15a, and reflects the incident laser light G to the combining part 15c. Thus, the combining part 15b emits the laser light R and the composite laser light RG toward the combining part 15c.

The combining part 15c transmits the laser light RG from the combining part 15b, and reflects the incident laser light B to the MEMS mirror 30. In this manner, the combining part 15c emits the composite laser light C comprising the laser lights RG and B, to the MEMS mirror 30.

The dimmer unit 20 comprises a liquid crystal panel (polarization control element) 21, and two polarizing filters (not shown) sandwiching the liquid crystal panel. The dimmer unit 20 drives the liquid crystal panel 21 in the frame rate control (FRC) method or the pulse width modulation (PWM) method based on the control data from the dimmer control unit 200 described later, thereby changing the transmittance of the composite laser light C, adjusting the composite laser light C entering the dimmer unit 20 to a desired light intensity, and outputting the adjusted light.

The transmittance of the dimmer unit 20 depends on a wavelength. The dimmer unit 20 adjusted to each dimming value controlled by the dimmer control unit 200 loses the white balance, because the laser lights R, G and B do not show a uniform light transmittance. However, as described later, the HUD device 1 can drive the LD 11, LD 12, and LD 13 by correctly reflecting the dimming value, even when the dimming value of the dimmer unit 20 changes.

The first light detection unit 40 comprises a photodiode or the like, receives a first reflected light C 1 reflected by a transmissive film 40a described later, and detects the light intensity of each color laser light R, G and B of the received first reflected light C 1. Specifically, the first light detection unit 40 outputs a detection signal (voltage) depending on the light intensity of each color laser light R, G and B of the received first reflected light C1. The detection signal is converted into a digital value by a not-shown A/D converter, and output to a main control unit 400 described later as light intensity information. The first light detection unit 40 is required only to detect the light intensity of each color laser light R, G and B before entering the dimmer unit 20, and Rather than an optical path of the composite laser light C, for example, may be separately provided at a location capable of detecting the light intensity of each color laser light R, laser light G, and laser light B before combining.

The first transmissive film (first light branching means) 40a is made of a transmissive member having a reflectivity of about 5%, for example. The first transmissive film 40a is disposed on the optical path of the composite laser light C between the combining part 15c and the dimmer unit 20, and transmits most of the composite laser light C from the combining part 15c, but reflects a part thereof to the first light detection unit 40 as a first reflected light C 1. When the first light detection unit 40 is separately provided at a location capable of detecting the light intensity of each color laser light R, laser light G and laser light B as described above, the first transmissive film 50a is disposed on the optical path of each color laser light R, laser light G and laser light B, and reflects a part of the color laser light R, laser light G and laser light B to the first light detection unit 40 as a reflected light.

The second light detection unit 41 comprises a color sensor or the like, receives a second reflected light C 2 reflected by a second transmissive film 41a described later, and detects the light intensity of each color laser light R, G and B of the received second reflected light C 2. The second light detection unit 41 outputs a detection signal (voltage) depending on the light intensity of each color laser light R, G and B of the received second reflected light C 2. The detection signal is converted into a digital value by a not-shown A/D converter, and output to a main control unit 400 described later as light intensity information. The second light detection unit 41 is required only to detect the light intensity of a composite laser light C of several numbers of pulses, and may be disposed at a specific position (a toning start position F 1a described later) of the screen 50 so as to receive the composite laser light C, when the MEMS mirror 30 scans on the toning start position F 1a, and to output the detection signal (voltage) depending on the light intensity of each color laser light R, G and B.

A second transmissive film (second light branching means) 41a is made of a transmissive member having a reflectivity of about 5%, similar to the first transmissive film 40a. The second transmissive film 41a is disposed on the optical path of the composite laser light C between the dimmer unit 20 and the MEMS mirror 30, and transmits most of the composite laser light C from the dimmer unit 20, but reflects a part thereof to the second light detection unit 41 as a second reflected light C 2. When the second light detection unit 41 is provided at a specific position (toning start position F 1a) of the screen 50, the first transmissive film 50 a may not be provided.

Figure 4:
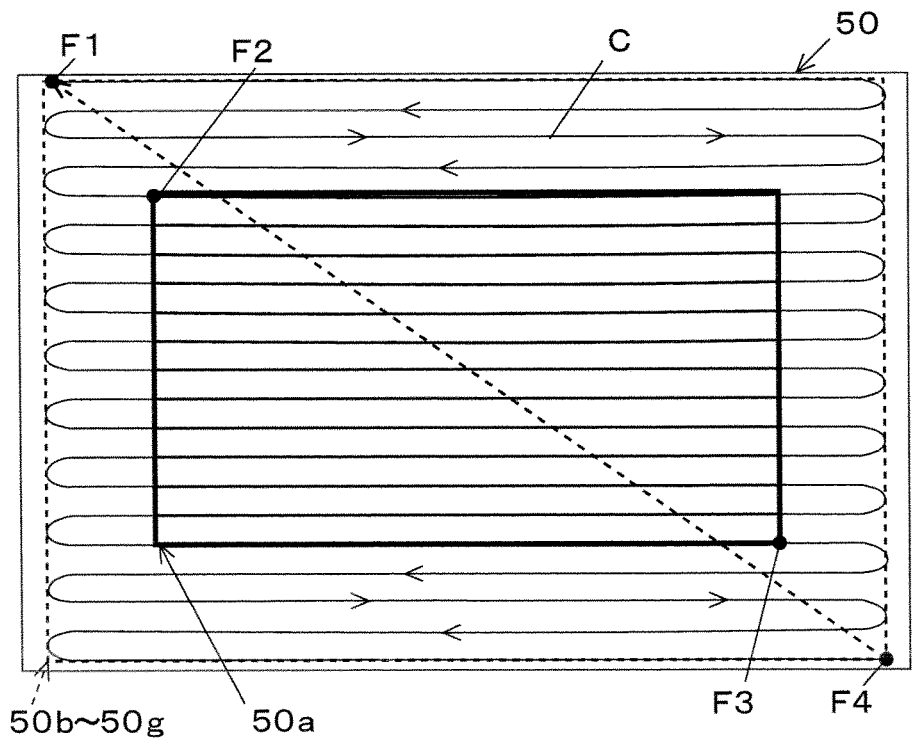
FIG. 4 is a diagram showing a scanning state on a screen in the embodiment.

The MEMS mirror 30 receives the composite laser light C from the composite laser light emission unit 10, vertically scans the received composite laser light C while horizontally scanning on the screen 50 as shown in FIG. 4, under the control of the scanning control unit 300 described later (based on a scanning control signal supplied from the scanning control unit 300), and displays a desired image M on the screen 50.

The screen (display unit) 50 receives the composite laser light C from the MEMS mirror 30 on the back side, transmits and diffuses the light, thereby displaying the image M on the front side. The screen 50 comprises a holographic diffuser, a microlens array, a diffusion plate and the like.

The screen 50 is, as in the region indicated by the thick frame in FIG. 4, is divided into a display area 50a as an area that the observer 3 can recognize the virtual image V (an area to emit the display light K reflected by the first reflection unit 60 or the like to the outside, and a non-display area (50b to 50h) as an area that the observer 3 cannot recognize the image. The non-display area (50b to 50h) will be described later.

Figure 7:
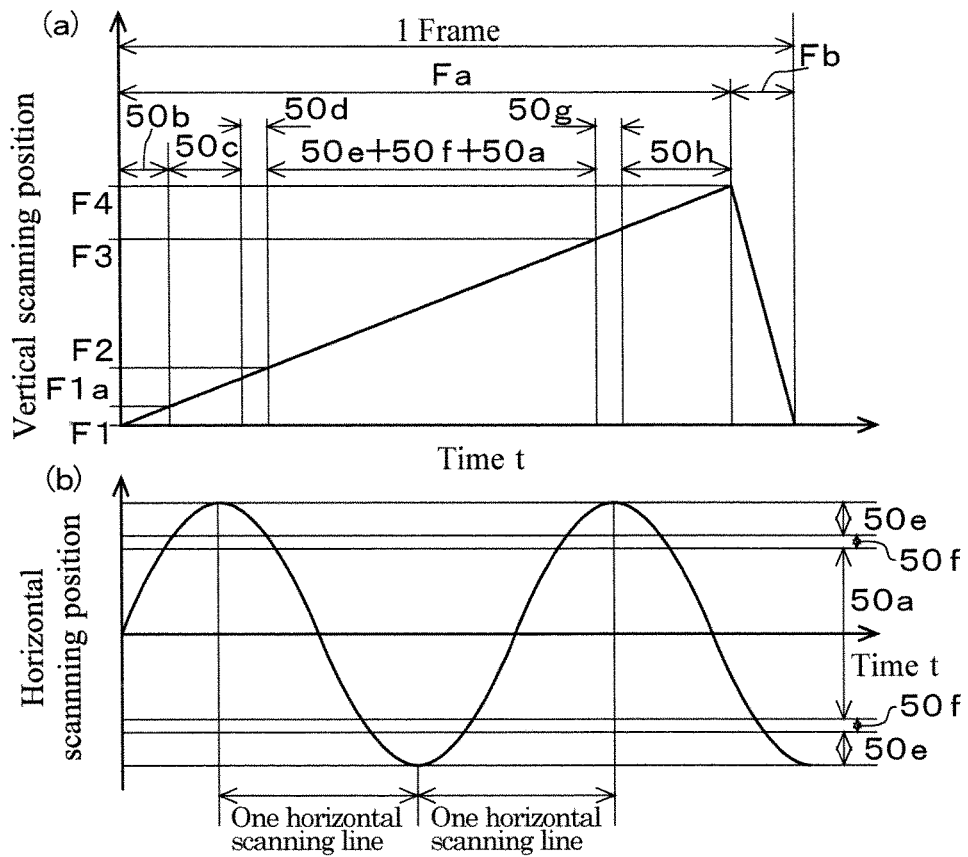
FIG. 7 is a diagram showing a time transition of a scanning position in the HUD device of the embodiment: (a) shows a time transition of a vertical scanning position, and (b) shows a time transition of a horizontal scanning position.

The MEMS mirror scans the composite laser light C from the scanning start position F 1 to the scanning end position F 4 on the screen 50 (refer to the solid line indicated by the sign C), as shown in FIG. 4, and returns to the scanning start position F 1 after reaching the scanning end position F 4, and restarts the scanning. The scanning period of the MEMS mirror 30 is, as shown in FIG. 7(a), divided into a real scanning period Fa as a period of scanning the display area 50a and non-display area (50b to 50h), and a retrace period Fb as a period of returning to the scanning start position F 1 from the scanning end position F 4. A frame period (one frame), that the MEMS mirror 30 starts scanning from the scanning start position F 1 to returning to the scanning start position F 1, is set to greater than a critical fusion frequency and less than 1/60 second (higher than 60 Hz) that a person can recognize a flicker.

The first reflection unit 60 comprises a plane mirror or the like, receives the display light K representing the image M displayed on the screen 50, and reflects the light to the second reflection unit 70.

The second reflection unit 70 comprises a concave mirror or the like, receives the display light K from the first reflection unit 60 toward the windshield 3. The display light K reflected by the second reflection unit 70 reaches the windshield 3 through the translucent part 90.

The housing 80 includes the composite laser light emission unit 10, the dimmer unit 20, the MEMS mirror 30, the first light detection unit 40, the second light detection unit 41, the screen 50, the first reflection unit 60, the second reflection unit 70 and the like. The housing 80 is made of a light shielding member.

The translucent part 90 is made of translucent resin such as acrylic, fits in the housing 80, and transmits the display light K from the second reflection unit 70. The translucent part 90 is formed in a curved shape so that a reached external light is not reflected to the observer 3. The inner surface of the translucent part 90 is provided with an external light sensor 91. The external light sensor 91 detects the external illuminance of the HUD device 1, and outputs the illuminance information to the control unit 400.

Next, the electrical configuration of the HUD device 1 will be explained.

Figure 5:
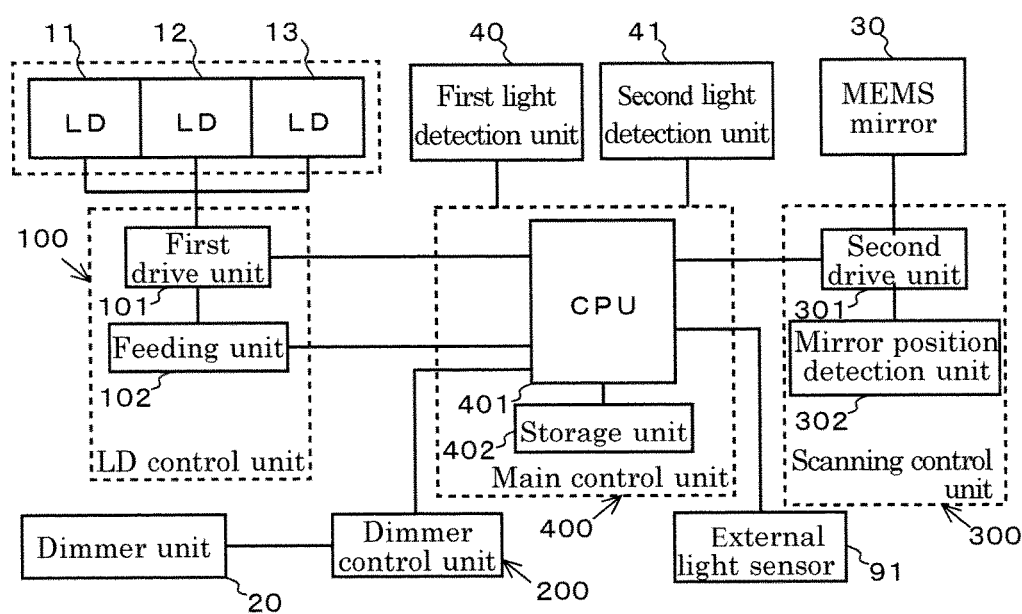
FIG. 5 is an electrical configuration diagram of the HUD device of the embodiment.

The HUD device 1 comprises an LD control unit 100, a dimmer control unit 200, a scanning control unit 300, and a main control unit 400 that controls the LD control unit 100, the dimmer control unit 200, and the scanning control unit 300, as shown in FIG. 5, in addition to those described hereinbefore. These control units are mounted on a printed circuit board (not shown) provided in the housing 80. These control units may be provided outside the HUD device 1, and electrically connected to the HUD device 1 (LD 11, LD 12, LD 13, liquid crystal panel 21, MEMS mirror 30, light detection units (40a, 41a, 91) and the like).

The LD control unit 100 drives the LD 11, LD 12, and LD 13, and comprises a first drive unit 101, and a feeding unit 102.

The first drive unit 101 comprises a driver IC or the like, and drives the LD 11, LD 12, and LD 13 by the PWM method or PAM (pulse amplitude modulation) method. Specifically, as described later, the first drive unit 101 drives by the PWM method in the low gradation area shown in FIGS. 11 and 14, and by the PAM method in the main gradation area. The first drive unit 101 supplies a drive current to the LD 11, LD 12, and LD 13 based on the current control data I supplied from the main control unit 400. In other words, the current control data I indicates the current values to be supplied to the LD 11, LD 12, and LD 13.

The feeding unit 102 supplies power to the LD 11, LD 12, and LD 13 through the first drive unit 101. The feeding unit 102 comprises a switching circuit or the like using a power supply IC, and a transistor. The feeding unit 102 switches the supply and non-supply of power to the LD 11, LD 12, and LD 13 under the control of the main control unit 400. The feeding unit 102 may be independently provided for LD 11, LD 12, and LD 13, or may be shared by them.

The dimmer control unit 200 comprises a driver IC or the like for driving the liquid crystal panel (polarization control element) 21, and drives the liquid crystal panel 21 by the FRC method or PWM method, based on a signal indicating a dimming value (a current dimming value stored in a storage 402) from the main control unit 400.

The scanning control unit 300 drives the MEMS mirror 30, and comprises a second drive unit 301, and a mirror position detection unit (scanning position detection means) 302.

The second drive unit 301 comprises a driver IC or the like, and drives the MEMS mirror 30 under the control of the main control unit 400 (based on the scanning control data from the main control unit 400). After driving the MEMS mirror 30, the second drive unit 301 obtains the scanning position detection data output from the mirror position detection unit 302, calculates feedback data based on the obtained scanning position detection data, and outputs the feedback data to the main control unit 400. The feedback data output from the second drive unit 301 includes a horizontal scanning switching data indicating the timing of switching reciprocation of the horizontal scanning, frame switching data indicating the timing of switching the frame, real scanning period ratio data indicating the ratio of real scanning period Fa in one frame (real scanning period Fa+retrace period Fb) and the likes.

The mirror position detection unit (scanning position detection means) 202 detects a deflection position of each time of a piezoelectric element for moving a mirror of the MEMS mirror 30, and outputs the detected position to the second drive unit 301 as scanning position detection data.

The main control unit 400 comprises a microcontroller, a field programmable gate array (FPGA), an application specific integrated circuit (ASIC), and the like. The main control unit 400 includes a CPU 401, and a storage unit 402. The storage unit 402 comprises an EE PROM, a flash, and the like, and stores programs and data required for operating the HUD device 1.

The CPU 401 reads a program from the storage unit 402, and executes the program, thereby controlling each part. The CPU 401 receives various information, such as, vehicle information and start signal (IGN, on-off signal of ACC) from an ECU (not shown) of the vehicle 2, LD current information indicating a current value flowing in the LD 11, LD 12, and LD 13, light intensity information from the first light detection unit 40, light intensity information from the second light detection unit 41, and feedback data from the scanning control unit 300. Based on such information, the CPU 401 generates and outputs gradation control data (current control data I) for driving the LD control unit 100, dimmer control data (dimming value) for driving the dimmer control unit 200, and scanning control data for driving the scanning control unit 300, thereby performing overall control of the HUD device 1. In other words, according to the input information, the CPU 401 drives the LD 11, LD 12, and LD 13, the liquid crystal panel 21, and the MEMS mirror 30 through the LD control unit 100, the dimmer control unit 200, and the scanning control unit 300, thereby generating the image M. Thus, the display light K representing the image M is emitted to the windshield 3, and the observer 3 can visually recognize the image M as a virtual image V.

Figure 6:
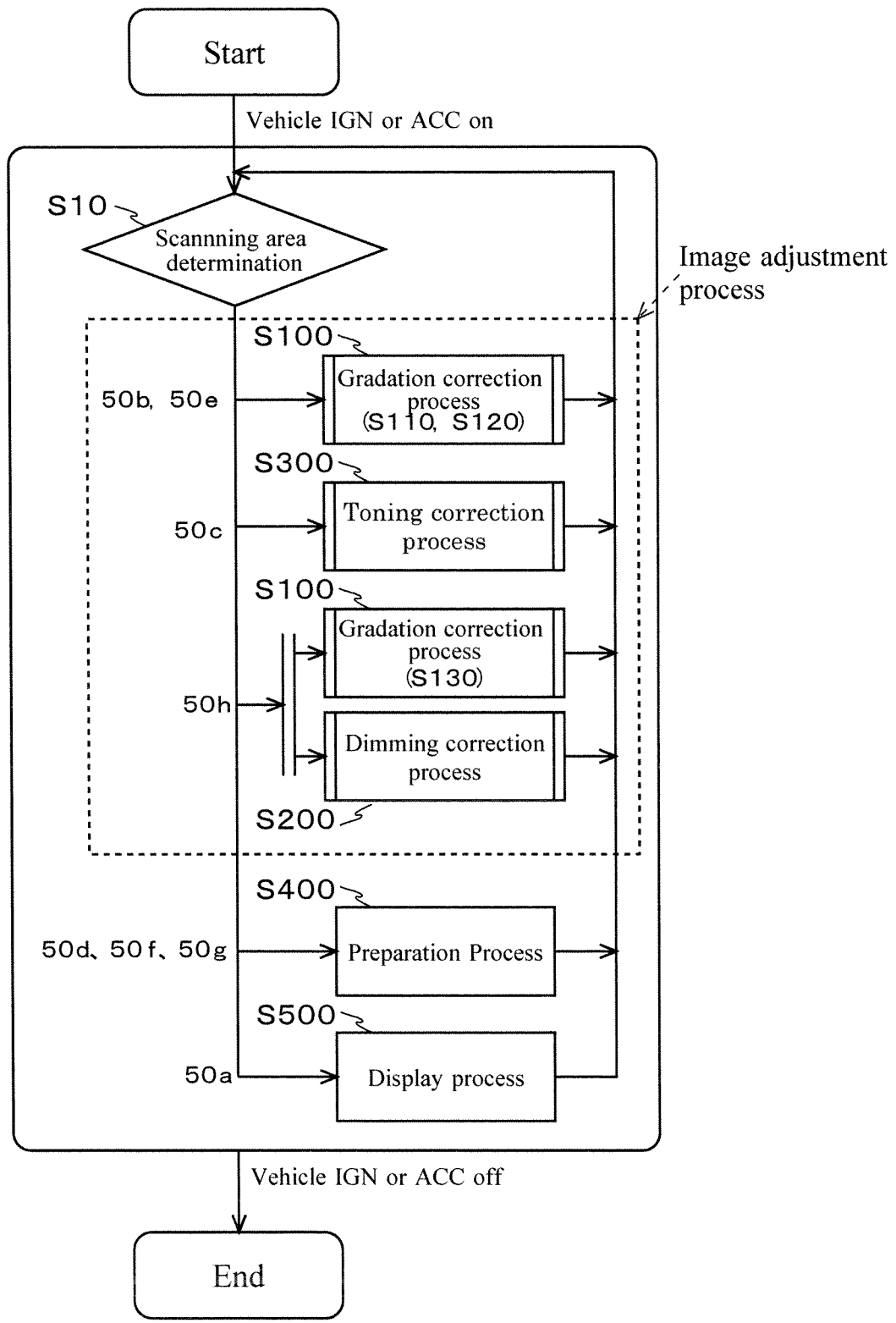
FIG. 6 is an operational flow diagram of the HUD device of the embodiment.

The HUD device 1 having the above configuration, as shown in FIG. 6, is activated in response to the turning on of the start switch of the vehicle 2 (by IGN, ACC, key unlocking, etc.). Then, the CPU 401 determines each scanning area (step S 10) based on the scanning position of the MEMS mirror 30, and executes the image adjustment process (S 100, S 200, S 300), LED preparation process S 400 for limiting the lighting of the LD 11, LD 12, and LD 13 in the region around the display area 50a, based on each scanning area, and display process S 500 for displaying the image M based on the image information. The storage unit 402 previously stores a program for executing the image adjustment process peculiar to the embodiment. When the HUD device 1 is activated, for example, the CPU 401 reads it, and executes the image adjustment process.

Hereinafter, the image adjustment process will be explained with reference to FIGS. 7 to 14.

(Image Adjustment Process)

The image processing process in this embodiment comprises a gradation correction process S 100, which calculates a new light intensity characteristic when the light intensity characteristic associating the light intensity L of the LD 11, LD 12, and LD 13 and the current control data I is changed by a temperature change, and corrects the gradation control data (the current control data I corresponding to the gradation level D) based on the new light intensity characteristic, a dimming correction process S 200, which dims the composite laser light C of the LD 11, LD 12, and LD 13, and modulates the brightness of the image M, and a toning correction process, which adjusts the white balance of the image M. The image adjustment process in this embodiment performs the above gradation correction process S 100, dimming correction process S 200, and toning correction process S 300, in the non-display areas 50b to 50h, while displaying the desired image M in the display area 50a.

Figure 8:
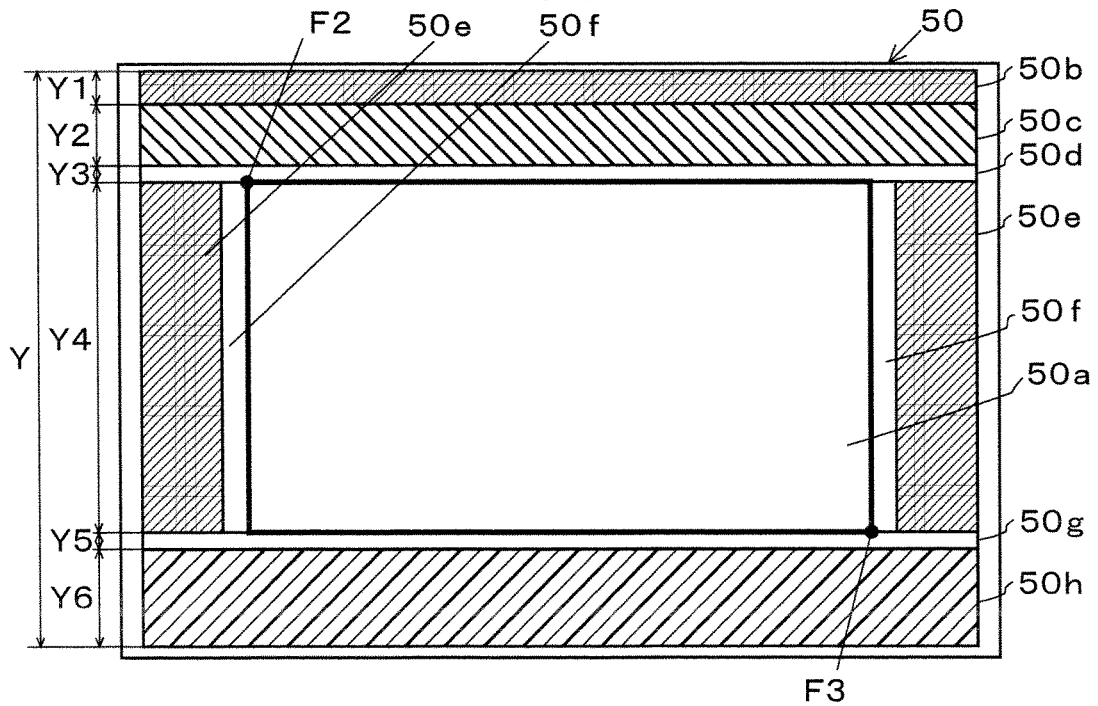
FIG. 8 is a diagram explaining the distribution of control process for each scanning area on the screen in the embodiment.

The gradation correction process S 100, dimming correction process S 200, and toning correction process S 300 are, as shown in FIG. 8, performed separately for each area that the MEMS mirror 30 scans the composite laser light C. Incidentally, the gradation correction process S 100 includes an update determination process S 110 for determining whether it is necessary to update the gradation control data, a gradation control data generation process S 120, and a gradation control data update process S 130. In the non-display area 50 b to 50h, the processes are allocated as follows (see FIG. 8). The non-display area 50b is a first gradation correction area for performing the update determination process S 110 and the gradation control data generation process S 120. The non-display area 50c is a toning correction area for performing the toning correction process S 300. The non-display area 50d is a first vertical preparation area for emitting a laser light of a small light intensity enough to turn off the LD 11, LD 12, and LD 13, or not visually recognized by the observer 3. The non-display area 50e is a second gradation correction area for continuing the update determination process S 110 and the gradation control data generation process S 120 in the first gradation correction area 50b. The non-display area 50f is a horizontal preparation area for emitting a laser light of a small light intensity enough to turn off the LD 11, LD 12, and LD 13, or not visually recognized by the observer 3. The non-display area 50g is a second vertical preparation area for emitting a laser light of a small light intensity enough to turn off the LD 11, LD 12, and LD 13, or not visually recognized by the observer 3. The non-display area 50h is a gradation/dimming switching area for performing the gradation control data update process S 130 and the dimming correction process S 200.

The storage unit 402 previously stores allocation of the control processes to be performed for each area and the number of horizontal scanning lines.

The number of horizontal scan lines Y in the real scanning period Fa obtained by reducing the number of horizontal scan lines in the retrace period Fb from the total horizontal scan lines in one frame is, as shown in FIG. 8, allocated to the number of horizontal scan lines Y 1 in the first gradation correction area 50b, the number of horizontal scan lines Y 2 in the toning correction area 50c, the number of horizontal scan lines Y 3 in the first vertical preparation area 50d, the number of horizontal scan lines Y 4 in the display area 50a (second gradation correction area 50e, horizontal preparation area 50f), the number of horizontal scan lines Y 5 in the second vertical preparation area 50g, and the number of horizontal scan lines Y 6 in the gradation/dimming switching area 50h. The vertical scanning position of the MEMS mirror 30 changes with the time t as shown in FIG. 7(a). The CPU 401 executes a control process corresponding to each scanning position. When the vertical scanning position of the MEMS mirror 30 is within the display area Fa, the time transition is as shown in FIG. 6(b). The CPU 401 shifts the display area 50, second gradation correction area 50e, and horizontal preparation area 50f in one horizontal scanning line, and executes a control process corresponding to each scanning position.

The CPU 401 counts the number of horizontal scanning lines by counting a signal of horizontal scanning switching data of the feedback data entered from the second drive unit 301, specifies the scanning position of the MEMS mirror 30 based on the count of the number of horizontal scanning lines, and executes the image adjustment process (update determination process S 110, gradation control data generation process S 120, gradation control data update process S 130, dimming correction process S 200, toning correction process S 300). Especially, when the count of number of the horizontal scanning lines is between 0 and Y 1, the CPU 401 determines that the scanning position of the MEMS mirror 30 is within the first gradation correction area 50b, and executes the update determination process S 110 and the gradation control data generation process S 120.

The CPU 401 refreshes the count of the number of the horizontal scanning lines by the signal input of the frame switching data that is the feedback data entered from the second drive unit 301, and starts the counting of the number of horizontal scan lines of a new frame.

(Gradation Correction Process)

Figure 9:
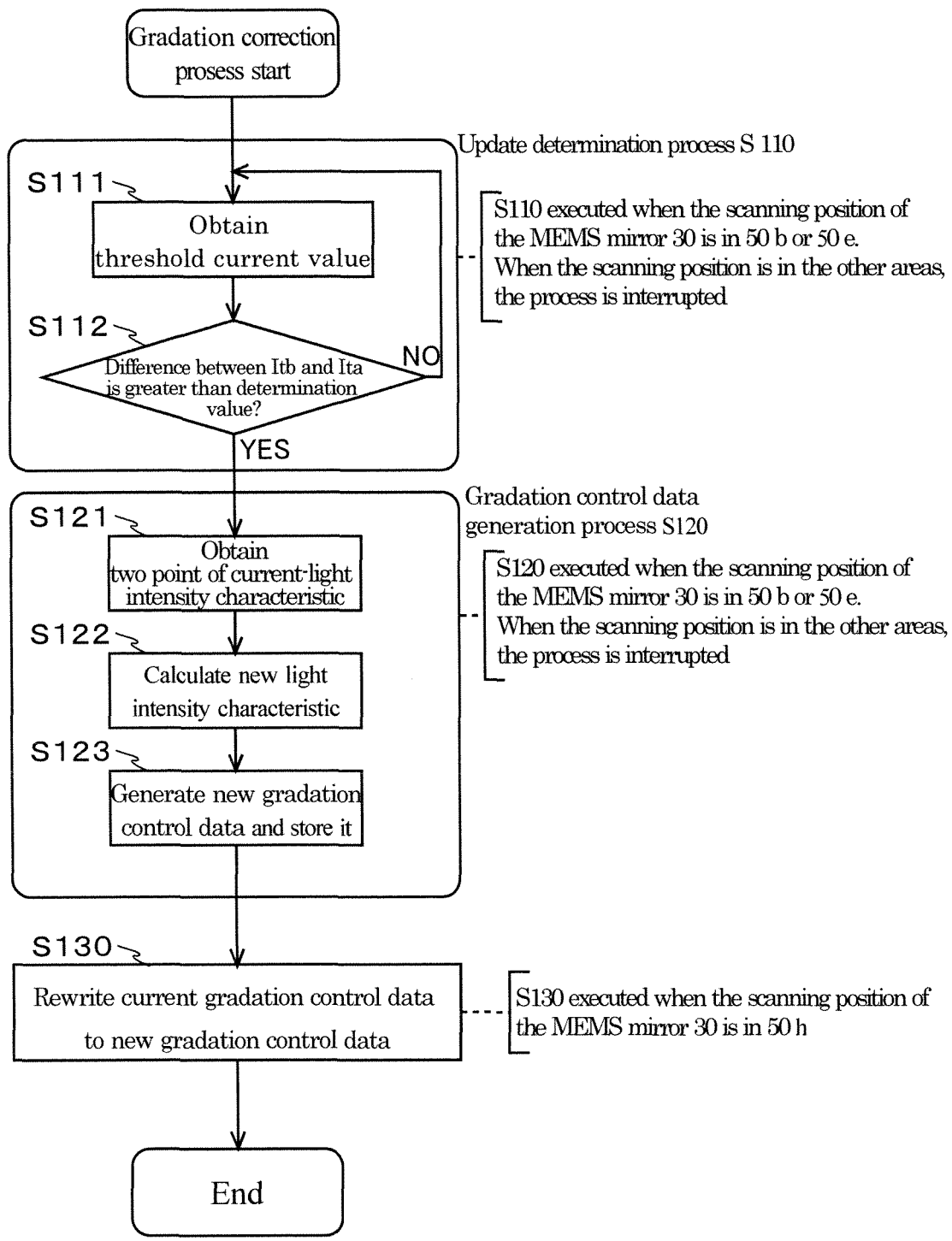
FIG. 9 is an operational flow diagram of gradation correction process in the HUD device of the embodiment.
Figure 10:
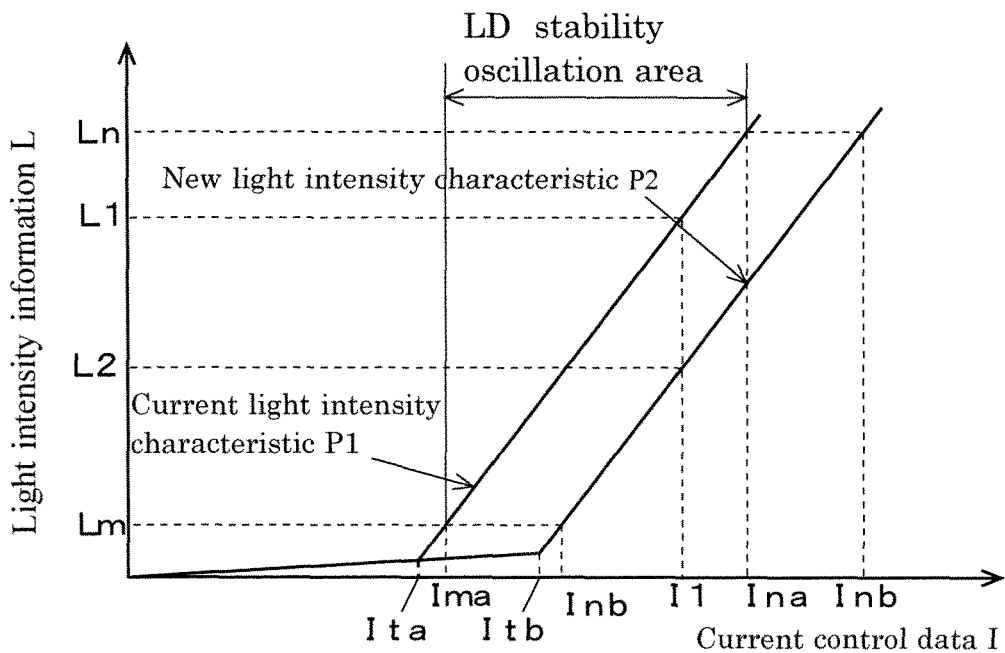
FIG. 10 is a diagram showing a current-light intensity characteristic in the HUD device of the embodiment.
Figure 11:
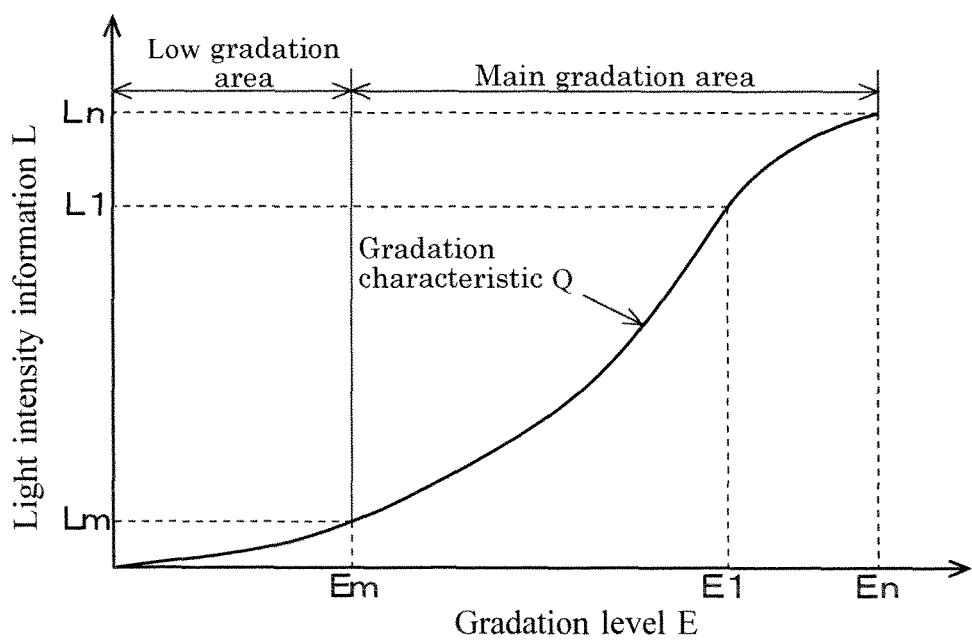
FIG. 11 is a diagram showing a gradation characteristic in the HUD device of the embodiment.

Hereinafter, the gradation correction process S 100 will be explained with reference to FIGS. 9 to 11. FIG. 9 is an operation flow diagram of the gradation correction process S 100. FIG. 10 is a diagram showing the current-light intensity characteristic P associating the LD current control data I and the light intensity L. FIG. 11 is a diagram showing the gradation characteristic Q associating the gradation level E and the light intensity L.

The gradation correction process S 100 is, as shown in FIG. 9, comprised of the update determination process S 110 for determining whether it is necessary to update the gradation control data, the gradation control data generation process S 120 for generating new gradation control data that is new gradation control data, and the gradation control data update process S 130 for updating current gradation control data actually used for drawing the image M to the new gradation control data. The gradation correction process S 100 is a control process for correcting the gradation control data stored in the storage unit 402.

The gradation control data is provided for each color, and associates the gradation level E determined by the CPU 401 based on the image information and the current control data indicating the current value of the signal output to the LD control unit 100 for controlling the gradation of LD 11, LD 12, and LD 13.

The gradation control data is obtained from the light intensity characteristic P that is changed by the temperatures and the like of LD 11, LD 12, and LD 13 as shown in FIG. 10, and the gradation characteristic Q that is the unchanged data previously stored in the storage unit 402 as shown in FIG. 11. The light intensity characteristic P is the data associating the current control data I indicating the current value supplied to the LD 11, LD 12, and LD 13 with the light intensity L of the laser lights R, G and B output from the LD 11, LD 12, and LD 13. The gradation characteristic Q is the data associating the gradation level E set in 6 bits (64 steps) and the light intensity L set for each gradation level E. For example, the gradation level E 1 is associated with the light intensity L 1 by the gradation characteristic Q (see FIG. 11), and the light intensity L 1 is associated with the current control data 11 by the current light intensity characteristic P shown in FIG. 9. Thus, as the gradation control data, the data associating the current control data 11 with the gradation level E 1 is generated.

The gradation characteristic Q forms a curve considering common characteristics γ, as shown in FIG. 11, and is unchanged data previously stored in the storage unit 402.

However, the light intensity characteristic P changes depending on the temperatures and the like of the operating environment of LD 11, LD 12, and LD 13. This deviates the correspondence between the gradation level E output from the CPU 401 to the LD control unit 100 and the light intensity L of laser lights R, G and B actually emitted from the LD 11, LD 12, and LD 13. Thus, it is impossible to emit the desired light intensity L.

In other words, when the light intensity characteristic P is, as shown in FIG. 10, changed from the current light intensity characteristic P 1 to the new light intensity characteristic Ps by temperature changes, the CPU 401 emits a laser light of the desired light intensity L 1 (gradation level L 1). Thus, even when the current control data I 1 is output as a signal to the LD control unit 100, and the current I 1 is supplied to the LD, the light intensity L of the laser light to be emitted is not L 1, but L 2 according to the new light intensity characteristic. Therefore, the gradation correction process S 100 in this embodiment corrects the gradation control data (characteristic data on the gradation level E and current control data I) of each of LD 11, LD 12, and LD 13, based on the changes in the light intensity characteristic P of the LD.

Hereinafter, the update determination process S 110 will be explained.

The update determination process S 110 detects whether the light intensity characteristic P of any of LD 11, LD 12 and LD 13 has changed by a specific value, and determines that it is necessary to correct the gradation control data, when the light intensity characteristic P has changed by a specific value.

In step S 111, the CPU 401 gradually increases a current value supplied to the red LD 11 through the LD control unit 100, and obtains the light intensity L of the red laser light R corresponding to the current value from the first light detection unit 40. In the process of obtaining by the first light detection unit the light intensity L of the laser light R corresponding to the current value while gradually increasing the current value supplied to the LD 11, the light intensity L is suddenly increased and detected at a certain current value. The CPU 401 determines the current control data I at this time to be a new threshold current value Itb that the LD 11 begins laser oscillation. Thereafter, the new threshold current value Itb is sequentially obtained for the green LD 12 and blue LD 13. In this manner, in step S111, the CPU 401 obtains the new threshold current value Itb for the LD 11, LD 12, and LD 13.

In step S 112, the CPU 401 compares the new threshold current value Itb of LD 11, LD 12, and LD 13 obtained in step S 111, with the current threshold current value Ita of LD 11, LD 12, and LD 13 stored in the storage unit 402.

When the difference between the new threshold current value Itb and the current threshold current value Ita of any one of LD 11, LD 12, and LD 13 is greater than the determination value previously stored in the storage unit 402 (step S 112: YES), the CPU 401 determines that it is necessary to correct the gradation control data, and rewrites the current threshold current value Ita in the storage unit 402 to the value of the new threshold current value Itb.

When the difference between the new threshold current value Itb and the current threshold current value Ita of all of LD 11, LD 12, and LD 13 is smaller than the determination value previously stored in the storage unit 402 (step S 112: NO), the CPU 401 determines that it is unnecessary to correct the gradation control data, returns the process to step S111, and terminates the update determination process S 110.

The above is the update determination process S 110 in this embodiment. The update determination process S 110 is executed when the scanning position of the MEMS mirror 30 is in the first gradation correction area 50b or second gradation correction area 50e. When the scanning position is in the other areas, the process is interrupted. When the scanning position of the MEMS mirror 30 comes again in the first gradation correction area 50b or second gradation correction area 50e, the process is resumed from the end of last time.

Hereinafter, the gradation control data generation process S 120 will be explained.

The gradation control data generation process S 120 generates new gradation control data that is new gradation control data in all of LD 11, LD 12, and LD 13.

I step S 121, the CPU 401 gradually increases a current value supplied to the red LD 11 through the LD control unit 100 to greater than the current threshold current value Itb obtained in step S110, and obtains the light intensity L of the red laser light R corresponding to the current value from the first light detection unit 40.

When the light intensity L obtained from the first light detection unit 40 reaches the minimum light intensity Lm previously stored in the storage unit 402, the CPU 401 determines that the current control data I at this time is the minimum current control data Imb as shown in FIG. 10.

Further, the CPU 401 gradually increases a current value supplied to the red LD 11, and determines that the current control data I at this time is the maximum current control data Inb, as shown in FIG. 10, when the light intensity L obtained from the first light detection unit 40 reaches the maximum light intensity Ln previously stored in the storage unit 402.

In step S 122, the CPU 401 calculates the straight line connecting two points (the minimum current control data Imb associated with the minimum light intensity Lmb and the maximum current control data Inb associated with the maximum light intensity Lnb) obtained in step S 121, and regards the straight line as a new light intensity characteristic P 2 that is a new light intensity characteristic.

In step S 123, the CPU 401 generates new gradation control data from the new light intensity characteristic P 2 calculated in step S 121 and the gradation characteristic Q previously stored in the storage unit 402, and stores the data temporarily in the storage unit 402. Similarly, for the green LD 12 and blue LD 13, the CPU 401 performs the operations of step S121 to step S 123, generates new gradation control data of the green LD 12 and blue LD 13, stores the data temporarily in the storage unit 402, and terminates the gradation control data generation process S 120.

The above is the gradation control data generation process S 120 in this embodiment. The gradation control data generation process S 120 is executed when the scanning position of the MEMS mirror 30 is in the first gradation correction area 50b or second gradation correction area 50e. When the scanning position is in the other areas, the process is interrupted. When the scanning position of the MEMS mirror 30 comes again in the first gradation correction area 50b or second gradation correction area 50e, the process is resumed from the end of last time.

Hereinafter, the gradation control data update process S 130 will be explained.

The gradation control data update process S 130 rewrites the current gradation control data used for drawing the image M to the new gradation control data calculated in step 402. As long as the gradation control data update process S 130 is not performed, the new gradation control data calculated in step S 120 is not used for drawing the image M, and the image M is drawn from the current gradation control data that is to be old data. The gradation control data update process S 130 is executed when the scanning position of the MEMS mirror 30 is in the gradation/dimming switching area 50 h, and is always terminated after completing the rewrite process.

The above is the gradation correction process. The flow of this process will be briefly described as follows.

First, in the update determination process S 110, detect whether the light intensity characteristic P (threshold current It) of any of LD 11, LD 12, and LD 13 has changed by a specific value. When the light intensity characteristic P (threshold current It) of any of LD 11, LD 12, and LD 13 has changed by a specific value, determine that it is necessary to correct the gradation control data.

Next, in the gradation control data generation process S 120, calculate the new light intensity characteristic P 2 in all of LD 11, LD 12, and LD 13, generate the new gradation control data from the calculated new light intensity characteristic P 2, and temporarily store the new gradation control data in the storage unit.

Then, after the scanning position of the MEMS mirror 30 comes in the gradation/dimming switching area 50h, rewrite the current gradation control data stored in the storage unit 402 to the new gradation control data generated in the gradation control data generation process S 120.

Figure 12:
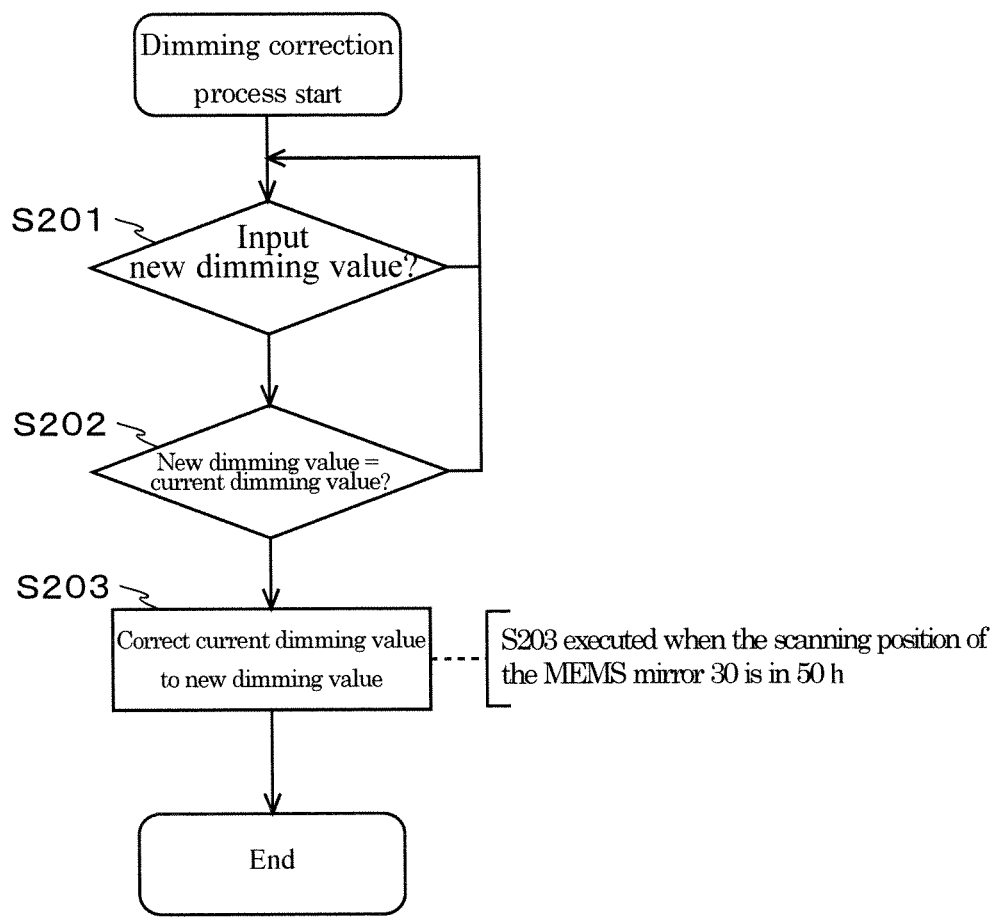
FIG. 12 is an operational flow diagram of dimmer correction process in the HUD device of the embodiment.

Next, the dimming correction process S 200 will be explained with reference to FIG. 12. FIG. 12 is a diagram showing the operation flow in the dimming correction process S 200.

(Dimming Correction Process)

The dimming correction process S 200 dims the composite laser light C of LD 11, LD 12, and LD 13 by the dimmer unit 20, and modulates the brightness of the image M.

In step S 201, the CPU 401 determines whether a new dimming value has been input from the ECU of the vehicle 2 or a new dimming value has been calculated based on the input of external illumination from the external light sensor 91. When the new dimming value has been input (step S 201: YES), the CPU 401 determines whether the new dimming value is the same as the current dimming value, which is the dimming value to control the dimming of the dimmer unit 20 by the dimmer control unit 200 at that time (step S 202). When the new dimming value is the same as the current dimming value (step S 202: YES), the CPU 401 determines that the dimming is unnecessary, and returns to step S 201.

In step S 203, after the scanning position of the MEMS mirror 30 comes in the gradation/dimming switching area 50h, the dimmer control unit 200 corrects the value of the current dimming value stored in the storage unit 402 to the value of the new dimming value input (calculated) in step S 201, and switches the dimmer unit to the target dimming value.

Figure 13:
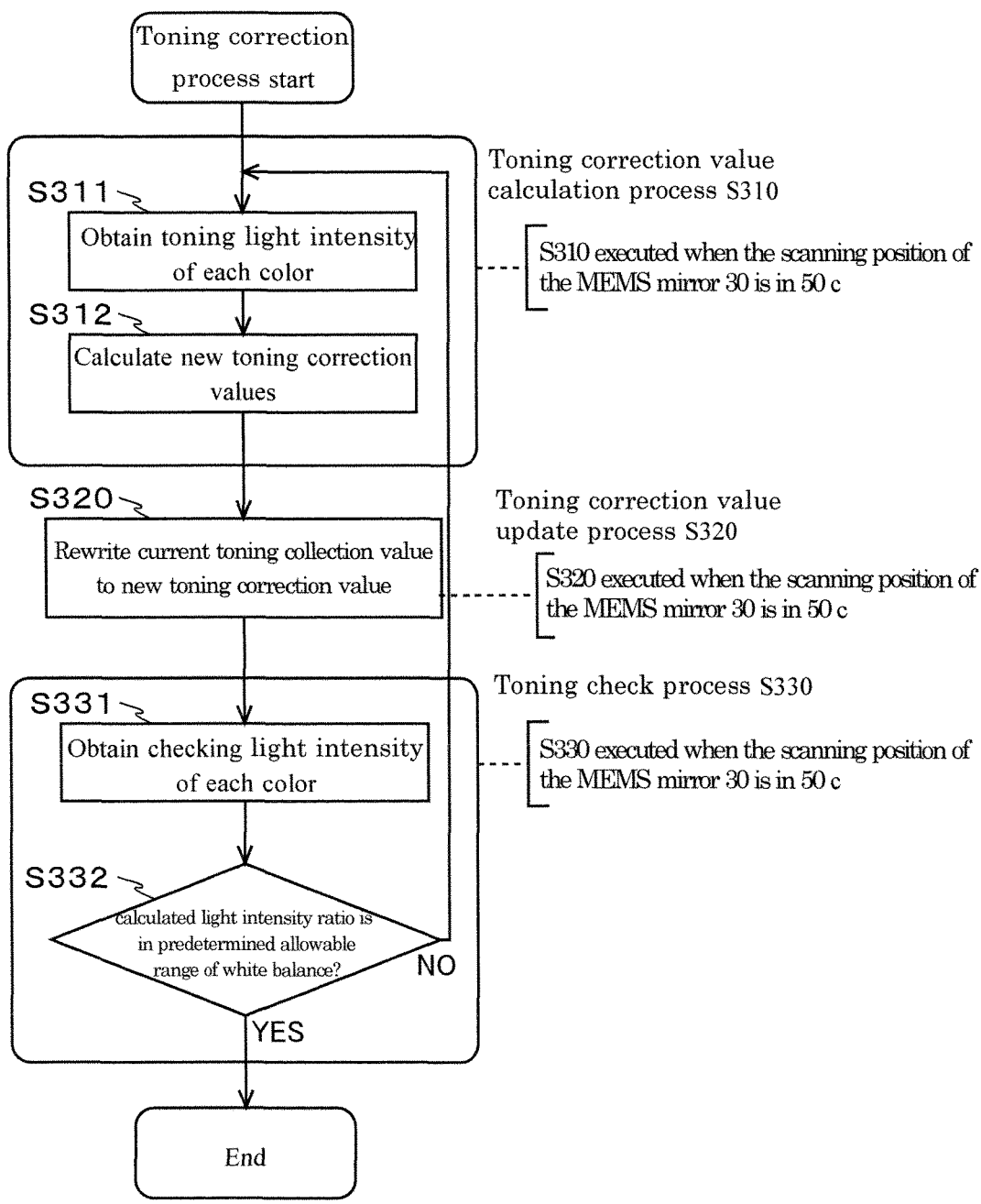
FIG. 13 is an operational flow diagram of color toning correction process in the HUD device of the embodiment.

Next, the toning correction process S 300 will be explained with reference to FIG. 13. FIG. 13 is a diagram showing the operation flow of the toning correction process S 300.

(Toning Correction Process)

The toning correction process S 300 is a process for adjusting the white balance of the image M, comprising a toning correction value calculation process S 310 that newly calculates a toning correction value (new toning correction value) for correcting the toning of the current control data I by multiplying with the current control data I corresponding to the gradation level E of the gradation control data, a toning correction value update process S 320 that rewrites the current toning correction value used for drawing the image M to the new toning correction value calculated by the toning correction value calculation process S 310, and a toning check process S 330 that drives the LD 11, LD 12, and LD 13 by the gradation data reflecting the toning correction value rewritten by the toning correction value update process S 320, and checks whether the laser lights R, G, and B emitted from the LD 11, LD 12, and LD 13 are in the allowable range of the desired white balance.

Next, the toning correction value calculation process S 310 will be explained.

The toning correction value calculation process S 310 newly calculates a toning correction value provided for each color (green and blue) to be multiplied with the current control data I corresponding to each gradation level E of the gradation control data, for adjusting the white balance.

In step S 311, through the LD control unit 100, the CPU 401 drives the red LD 11 by the current control data I corresponding to a maximum oscillation gradation level En in the current gradation control data stored in the storage unit 402, and obtains the light intensity (toning light intensity) L of the red laser light R corresponding to the current control data I, from the second light detection unit 41. Then, the CPU 401 drives the green LD 12 and blue LD 13b in the same manner, and obtains the light intensity (toning light intensity) L acquired when driving by the current control data I corresponding to the maximum oscillation gradation level En in the current gradation control data, from the second light detection unit 41. The current control data I corresponding to the maximum oscillation gradation level En used at this time is current control data not reflecting the current toning correction value (toning is not corrected) that is a past toning correction value calculated before entering the toning correction process S 300 of this time.

In step S 312, the CPU 401 calculates the light intensity ratio of red laser light R, green laser light G, and blue laser light B, based on the light intensity (toning light intensity) L of each color detected in step S 311. The CPU 401 compares the calculated light intensity ratio with the white balance ratio that is previously stored in the storage unit 402, calculates new gradation correction values of green and blue based on red, and shifts to the next toning correction value update process S 320.

With the toning correction value update process S 320, the CPU 401 rewrites the current toning collection value stored in the storage unit 402 to the new toning correction value calculated in step S 312. The current toning correction value is multiplied with the current control data I corresponding to all gradation level E in the current gradation control data of green and blue, and the toning is corrected so that the LD 11, LD 12, and LD 13 become a desired white balance.

After completing the toning correction value update process S 320, the CPU 401 shifts to the toning check process S 330. The toning check process S 330 drives the LD 11, LD 12, and LD 13 by the gradation control data reflecting the toning correction value rewritten by the toning correction value update process S 320 (toning is corrected), and checks whether the laser lights are in the allowable range of the desired white balance.

In step S 331, through the LD control unit 100, the CPU 401 drives the red LD 11 by the current control data I corresponding to the maximum oscillation gradation level En in the current gradation control data stored in the storage, and obtains the light intensity (checking light intensity) L of the red laser light R corresponding to the current control data I from the second light detection unit 41. Then, the CPU 401 drives the green LD 12 and blue LD 13 in the same manner, and obtains the light intensity (checking light intensity) L acquired when driving by the current control data I corresponding to the maximum oscillation gradation level En in the current gradation control data, from the second light detection unit 41. The current control data I used when emitting the green laser light G and blue laser light B is current control data reflecting the current toning correction value (toning is corrected) that has been updated by the toning correction value update process S 320.

In step 332, the CPU 401 calculates the light intensity ratio of red laser light R, green laser light G, and blue laser light B, based on the light intensity (checking light intensity) L of each color detected in step S 311. The CPU 401 compares the calculated light intensity ratio with the white balance ratio previously stored in the storage unit 402, and determines whether the calculated light intensity ratio is in the predetermined allowable range of white balance. When the light intensity ration is not in the predetermined allowable range of white balance, the CPU 401 returns to step S 311, and repeats the toning correction process S 300.

The above is the toning correction process S 300 in this embodiment. The toning correction process S 300 is executed when the scanning position of the MEMS mirror 30 is in the toning correction area 50c. The toning correction area 50c is provided wide enough to terminate the toning correction process S 300.

The above is the image adjustment process (update determination process S 110, gradation control data generation process S 120, gradation data update process S 130, dimming correction process S 200, toning correction process S 300) in this embodiment. The various data (gradation level E, light intensity L, current control data I, toning correction value H, PWM value D) stored in the storage unit 402 will be explained with reference to FIG. 14.

The storage unit 402 previously stores the gradation characteristic Q for each color, considering the general characteristics γ associating the gradation level E that is the data for controlling the gradation of LD 11, LD 12, and LD 13 determined by the CPU 401 based on the image information, and the reference light intensity L that is the light intensity L as a reference for each gradation level E.

The storage unit 402 stores the light intensity characteristic P associating the light intensity L with the current control data I that indicates the current value supplied to the LD 11, LD 12, and LD 13, and updates the light intensity characteristic P to the latest characteristic data based on the characteristic change in the LD 11, LD 12, and LD 13.

The gradation level E is associated with the current control data I (the gradation control data is generated) by the gradation characteristic Q associating the gradation level E with the light intensity L, and the light intensity characteristic P associating the gradation level E with the current control data I.

The storage unit 402 stores the PWM value D associated with the gradation level E for PWM controlling the LD 11, LD 12, and LD 13. The gradation level E is divided into a low gradation area of a predetermined low gray level, and a main gradation area of a level higher than the low gradation area. In the main gradation area, the gradation control is performed in the PAM method by changing the current value supplied to the LD 11, LD 12, and LD 13, thereby modulating the light intensity L of the emission of LD 11, LD 12, and LD 13. In the low gradation area, the current control data I is fixed to the minimum current control data Im, and the gradation control is performed in the PWM method based on the PWM value D stored in the storage unit 402, thereby modulating the light intensity L of the emission of LD 11, LD 12, and LD 13.

The storage unit 402 stores the dimming correction value (current toning correction value) updated by the toning correction process S 300. The CPU 401 outputs the current control data I (toning is corrected) to the LD control unit 100 after correcting the current control data I of the gradation control data by the dimming correction value.

The HUD device 1 in the embodiment described above comprises a dimmer unit 20 that modulates the light intensity of the laser light emitted from a light source, a first light detection means 40 that detects the light intensity of the laser light before entering the dimmer unit 20, and a second light detection means 41 that detects the light intensity of the laser light after entering the dimmer unit 20. The HUD device 1 is capable of correcting the gradation control data based on the gradation characteristic Q previously stored in the storage unit 402 without depending upon the transmittance of the dimmer unit 20, by calculating the light intensity characteristic of each color of the light source based on the light intensity L detected by the first light detection means 40, adjusting the white balance considering the transmittance of the dimmer unit 20 by adjusting the white balance of each color of the light source based on the light intensity L detected by the second light detection means 41, and displaying the image M of stable display color and brightness even when the light intensity characteristics of LD 11, LD 12, and LD 13 change.

According to the HUD device 1 in this embodiment, as the control process is allocated for each area scanned by the MEMS mirror 30, it is possible to stably execute the control process without affecting the other important control processes even when one control process is prolonged. In particular, the toning correction area 50c for adjusting the white balance of the image M (toning correction process S 300) is provided wide enough to terminate the toning correction process S 300, and the image M of a desired white balance ratio can be obtained for each frame without depending upon the light intensity characteristics of LD 11, LD 12, and LD 13 and the transmittance of the dimmer unit 20. The gradation correction process S 100 can be executed with high accuracy without affecting the toning correction process S 300 by repeating interruptions and resumptions until the control process is terminated.

The toning correction area 50c is provided between the gradation/dimming switching area 50h for switching the gradation control data for controlling the gradation of LD 11, LD 12, LD 13 and the dimming value for controlling the dimming value for controlling the dimmer unit 20, and the display area 50a for displaying the image M of the next frame. Therefore, even when the gradation control data and the dimming value change, it is certainly possible to execute the toning correction process, and generate the image M of stable display color.

The first vertical preparation area 50d, the horizontal preparation area 50f, and the second vertical preparation area 50g are provided around the display area 50a, for emitting the laser light of the light intensity small enough to turn off the LD 11, LD 12, and LD 13, or not to be recognized by the observer 3. Therefore, it is possible to prevent an accidental emission (scanning) to the display area 50a of the correction laser light that is to be emitted from the LD 11, LD 12, and LD 13 during the gradation correction process S 100 and the toning correction process S 300.

Further, the first light detection unit 40 and the second light detection unit 41 detect the light intensity L of one of the laser lights (first reflected light C 1 and the second reflected light C 2) branched by the first transmissive film (first light branching means) 40a and the second transmissive film (second light branching means) 41a. Therefore, it is possible to generate the image M by one of the laser lights branched by the first transmissive film (first light branching means) 40a and the second transmissive film (second light branching means) 41a, and it is possible to perform the image adjustment process while generating the image M.

[Modification]

The present invention is not to be limited by the above embodiments and drawings. It is possible to appropriately make changes to the embodiments and drawings (including deletion of the components) without departing from its spirit or essential characteristics. An example of the modification will be described below.

In the above embodiment, the dimmer unit 20 comprises a liquid crystal panel 21, and two polarizing filters sandwiching the liquid crystal panel. The dimmer control unit 200 is a driver IC or the like for driving the liquid crystal panel 21. The dimmer unit 20 may comprise a neutral density (ND) filter 211 with a different optical density (OP) value in the horizontal direction or rotational direction, and a drive unit 211a comprising a stepping motor for rotationally driving the ND filter 211. The dimmer control unit 200 may comprise a driver IC for controlling the drive unit 211a, and the composite laser light C may be dimmed by the dimmer control unit 200 by rotationally driving the ND filter 211 through the drive unit 211a.

The dimmer unit 20 may comprise two reflective aluminum wire grid polarizing filters, and a drive unit 211a for rotationally driving one of the reflective aluminum wire grid polarizing filters. The dimmer unit 20 may dim the composite laser light C by rotationally driving one of the reflective aluminum wire grid polarizing filters.

The dimmer unit 20 may be provided on each of the laser lights R, G, and B before being composed, not on the optical path of the composite laser light C. With such a configuration, the laser lights R, G, and B can be individually dimmed.

In the above embodiment, the timing of each control process of the image adjustment process is determined by counting the horizontal scanning of the MEMS mirror 30. The scanning position may be detected in any method including counting the scanning time.

In the above embodiment, light is detected by using a transmissive film (light branching means) while generating the image M. A transmissive light detector may be provided, and the light intensity L may be detected while transmitting the light used for generating the image M. However, in the case of using a transmissive light detector, it is necessary to consider the wavelength dependence of transmittance for each color, and it is desirable to provide a light branching means as in the above embodiment.

Further, in the above embodiment, the gradation control data update process S 130 and the dimming correction process S 200 are performed only in the gradation/dimming switching area 50h. In the gradation control data update process S 130 and the dimming correction process S 200, it is needless to emit an unnecessary laser light, and it is allowed to perform the gradation control data update process S 130 or the dimming correction process S 200 even while the second vertical preparation area 50g is being scanned or during the retrace period Fb.

The toning correction process S 300 may be periodically and intermittently performed for every few frames, not every time in the toning correction area 50c. Only when the gradation control data or the dimming value is updated in the gradation/dimming switching area 50h, the toning correction process S 300 may be performed in the next frame. With such a configuration, the control load of CPU 401 can be reduced.

INDUSTRIAL APPLICABILITY

The present invention relates to a display device of a vehicle, and is applicable as a display device, which is mounted on a mobile body, such as an automobile, projects a display image on a windshield of a vehicle, and displays vehicle information for displaying a virtual image.

DESCRIPTION OF REFERENCE NUMERALS

1 HUD device (Laser scanning display device)
2 Vehicle
3 Observer
10 Composite laser light emission unit
20 Dimmer unit
30 MEMS mirror (Scanning means)
40 First light detection unit (First light detection means)
41 Second light detection unit (Second light detection means)
100 LD control unit
101 First drive unit
102 Feeding unit
200 Dimmer control unit
300 Scanning control unit
301 Second drive unit
302 Mirror position detection unit
400 Main control unit
401 CPU
402 Storage unit

The invention claimed is:

1. A laser scanning display device mounted on a vehicle comprising:
   a plurality of light sources of different emission colors that emits a laser light with a light intensity corresponding to a current supplied;
   a data storage that stores a gradation level of a plurality of steps corresponding to a plurality of reference light intensities as a reference, and current control data associating with the gradation level and indicating a current supplied to the light source;
   a light source controller that adjusts a current supplied to the light source by switching the gradation level based on an image signal;

a scanner that scans the laser light and emits a display light that allows a predetermined image to be displayed on a windshield of the vehicle;

a dimmer disposed on a transmission path of the laser light between the light source and the scanner, the dimmer modulating the light intensity of the laser light emitted from the plurality of light sources based on a dimming value input from one of an engine control unit or an ambient light sensor;

a first light detector disposed on the transmission path of the laser light between the plurality of light sources and the dimmer, the first light detector detecting the light intensity of the laser light before entering the dimmer;

a second light detector disposed on the transmission path of the laser light between the dimmer and the scanner, the second light detector detecting the light intensity of the laser light after entering the dimmer;

a gradation adjuster that calculates a current-light intensity characteristic of each color of the light source, based on the light intensity of the light source detected by the first light detector by supplying a predetermined current from the light source controller, and corrects the current control data stored in the data storage, based on the calculated current-light intensity characteristic; and a tone adjuster that detects the light intensity of the light source detected by the second light detector by supplying a predetermined current from the light source controller, compares the detected light intensities of each color of the light source, and adjusts a white balance by correcting the current control data.

2. The laser scanning display device according to claim 1, wherein at least one of the first light detector and the second light detector is a branched light detector having:
  a light divider that branches the laser light; and
  a light intensity detector that detects the light intensity of one of the laser lights branched by the light divider.

3. The laser scanning display device according to claim 1, further comprising a scanning position detector that detects a scanning position of the scanner, wherein an area scanned by the scanner has a display area to output the laser light scanned by the scanner to the outside, and a non-display area not to output the laser light to the outside, and the gradation adjuster and the tone adjuster use the first light detector and the second light detector, when the scanning position of the scanner is in the non-display area.

4. The laser scanning display device according to claim 3, wherein when the scanning position detector detects a specific toning start position between a position to complete scanning of the display area and a position to start scanning of the display area in a next frame, the tone adjuster starts correction of the current control data stored in the data storage.

5. The laser scanning display device according to claim 3, wherein the gradation adjuster rewrites the current control data in the data storage, until the scanning position detector detects the toning start position after completing the scan of the display area.

6. The laser scanning display device according to claim 2, further comprising a scanning position detector that detects a scanning position of the scanner, wherein an area scanned by the scanner has a display area to output the laser light scanned by the scanner to the outside, and a non-display area not to output the laser light to the outside, and the gradation adjuster and the tone adjuster use the first light detector and the second light detector, when the scanning position of the scanner is in the non-display area.

7. The laser scanning display device according to claim 4, wherein the gradation adjuster rewrites the current control data in the data storage, until the scanning position detector detects the toning start position after completing the scan of the display area.

8. The laser scanning display device according to claim 1, wherein the dimming value input from the ambient light sensor is calculated based on ambient illumination from the ambient light sensor.

* * * * *